United States Patent
Verma et al.

(10) Patent No.: US 6,614,809 B1
(45) Date of Patent: Sep. 2, 2003

(54) METHOD AND APPARATUS FOR TUNNELING ACROSS MULTIPLE NETWORK OF DIFFERENT TYPES

(75) Inventors: Rohit Verma, Schaumburg, IL (US); Janakiraman Senthilnathan, Mount Prospect, IL (US); Madhvi Verma, Schaumburg, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/515,307

(22) Filed: Feb. 29, 2000

(51) Int. Cl.[7] .................................................. H04J 3/22
(52) U.S. Cl. ....................... 370/469; 709/249; 709/238
(58) Field of Search .................................. 370/400, 401, 370/389, 395.5, 395.52, 395.53, 395.54, 395.6, 395.6 T, 464, 420, 465, 466, 469, 471, 474, 475, 476, 497, 902, 905, 911, 912; 709/238, 249

(56) References Cited

U.S. PATENT DOCUMENTS

| 5,528,595 A | | 6/1996 | Walsh et al. .............. 380/85.13 |
| 6,094,437 A | * | 7/2000 | Loehndorf et al. ......... 370/420 |

(List continued on next page.)

FOREIGN PATENT DOCUMENTS

| WO | WO 200241589 A1 | * | 5/2002 | ............ H04L/12/56 |
| WO | WO 200278253 A2 | * | 10/2002 | ............ H04L/12/00 |

OTHER PUBLICATIONS

W. Townsley et al., "*Layer Two Tunneling Protocol L2TP*", Network Working Group, RFC 2661, Aug. 1999, pp. 1–80.
Rigney et al., "*Remote Authentication Dial In User Service (RADIUS)*", Network Working Group, RFC 2138, Apr. 1997, pp. 1–65.

(List continued on next page.)

*Primary Examiner*—Dang Ton
*Assistant Examiner*—Tri H. Phan
(74) *Attorney, Agent, or Firm*—McDonnell Boehnen Hulbert & Berghoff

(57) ABSTRACT

A system and method are shown for establishing tunnel connections across multiple networks of differing types. A tunnel media translator device is connected to both a first and second network of different types. The translator receives a tunnel connection set-up request (SCCRQ) from a tunnel initiator on the first network. The translator uses the value from a host name field of the SCCRQ to obtain an address for a tunnel endpoint on the second network, through the use of either pre-configured static tables or a host name resolution service. The translator creates a dynamic table entry that contains the address and tunnel identifier value for the tunnel initiator from the SCCRQ message and the address of the tunnel endpoint obtained from resolving the host name. The translator inserts the address for the tunnel endpoint into a destination address field of the SCCRQ and its own address on the second network into a source address field of the SCCRQ and re-transmits the SCCRQ onto the second network. The translator will receive a tunnel connection set-up reply (SCCRP) from the tunnel endpoint and will use the address of the tunnel endpoint and the destination tunnel identifier for the tunnel initiator from the SCCRP to find the matching dynamic table entry. The translator will insert the address of the tunnel initiator from the dynamic table entry into the destination address field of the SCCRP and its own address on the first network into the source address field of the SCCRP and re-transmit the SCCRP onto the first network. Subsequent tunnel packets received by the translator for the connection are translated using the address and tunnel identifier for the tunnel initiator from the tunnel packet to find the dynamic table entry, inserting the address of the tunnel endpoint from the dynamic table entry into the destination address field of the tunnel packet, and re-transmitting the tunnel packet.

17 Claims, 13 Drawing Sheets

U.S. PATENT DOCUMENTS

| | | | | |
|---|---|---|---|---|
| 6,097,720 | A | * | 8/2000 | Araujo et al. ............... 370/355 |
| 6,205,488 | B1 | * | 3/2001 | Casey et al. ................ 709/238 |
| 6,438,612 | B1 | * | 8/2002 | Ylonen et al. .............. 709/249 |
| 6,452,920 | B1 | * | 9/2002 | Comstock ................... 370/349 |
| 6,507,577 | B1 | * | 1/2003 | Mauger et al. ............. 370/356 |
| 6,522,627 | B1 | * | 2/2003 | Mauger ...................... 370/230 |

OTHER PUBLICATIONS

C. Perkins, *IP Mobility Support*, Network Working Group, RFC 2002, Oct. 1996, pp. 1–79.

W. Simpson, "*PPP In HDLC–Like Framing*", Network Working Group, RFC 1662, Jul. 1994, pp. i–25.

D. Rand, "*PPP Reliable Transmission*", Network Working Group, RFC 1663, Jul. 1994, pp. 1–8.

S. Deering, "*Host Extensions For IP Multicasting*", Network Working Group, RFC 1112, Aug. 1989, pp. 1–17.

W. Fenner, "*Internet Group Management Protocol, Version 2*", Network Working Group, RFC 2236, Nov. 1997, pp. 1–24.

W. Simpson, "*The Point–To–Point (PPP)*", Networking Working Group, RFC 1661, Jul. 1994, pp. i–52.

* cited by examiner

METHOD AND APPARATUS FOR TUNNELING ACROSS MULTIPLE NETWORK OF DIFFERENT TYPES

FIELD OF INVENTION

The present invention relates to data communications. More specifically, it relates to the transmission of packets over a communications link that crosses multiple types of networks.

BACKGROUND OF THE INVENTION

Connection oriented point-to-point communication links, such as a Layer 2 Tunneling Protocol (L2TP) tunnel, are an increasingly common feature of network infrastructures. Tunnels are prearranged connections established by agreement between internet service providers (ISPs). See Request for Comment (RFC) 2661 and *Layer Two Tunnelling Protocol* (L2TP), A. Valencia, et al., draft-ietf-pppext-l2tp-16.txt, June 1999, herein incorporated by reference, available from the Internet Engineering Task Force (IETF) at www.ietf.org for more information.

FIG. 1 shows an architecture 10 involving an internet protocol (IP) network 70 to which tunnel initiator 30 is linked via network connection 32, tunnel initiator 40 is linked via network connection 42 and tunnel endpoint 50 is linked via network connection 52. A remote client 20 is linked to tunnel initiator 30 via communication link 22 that is tunneled through IP network 70 via tunnel connection 56 from tunnel initiator 30 to tunnel endpoint 50. Another remote client 24 is linked to tunnel initiator 40 via communication link 26 that is tunneled through IP network 70 via tunnel connection 66 from tunnel initiator 40 to tunnel endpoint 50. Tunnel endpoint device 50 is also connected to a Local Area Network 80 via network connection 54. A server device 84 is linked to LAN 80.

One example of a tunnel initiator or tunnel endpoint device is a network access server, such as that described in the patent to Dale M. Walsh et al., U.S. Pat. No. 5,528,595, which is fully incorporated by reference herein and describes an integrated network access server suitable for use in the present invention. Such a device has been commercialized widely by 3Com Corporation (previously U.S. Robotics Corp.) under the trade designation Total Control™ Enterprise Network Hub. Network access servers similar in functionality, architecture and design are available from other companies, including Ascend Communications, Livingston Enterprises, Multitech, and others. The invention is suitable for implementation in network access servers from the above companies, and other similar devices.

An L2TP tunnel typically provides a conduit for communications between a client device served by a tunnel initiator and a server device served by tunnel endpoint, i.e. tunnel connection 56 between tunnel initiator 30 and tunnel endpoint 50 that transports communication between remote client 20 and server 84. Typically, a single tunnel slot provides the communication link between a client and server.

When a client device establishes a dial-up connection with a tunnel initiator (TI) 30 or 40, then the TI typically recognizes the client device as a tunnel client by means of an authentication protocol, such as RADIUS, see Request For Comment (RFC) 2138, herein incorporated by reference. An authentication, authorization and accounting (AAA) server 74, such as a RADIUS server, may be connected to IP network 70 to provide AAA services to the tunnel initiators and other devices on the network. The authentication process can be adapted to provide an address for a tunnel endpoint device for the client. There exist other means for identifying a tunnel client, such as through the use of a mobile identification number (MIN) in mobile applications or, for protocols not directed toward mobile applications, the use of a Dial-up Number Information Service (DNIS) or Automatic Number identification (ANI), that can also be used to identify a tunnel endpoint for a client and establish a tunnel connection. Alternatively, the client device itself may provide the tunnel endpoint address. In still another approach, each TI may have a pre-constructed table containing entries that associate a client device identifiers with a tunnel endpoint address value. Independent of how the tunnel endpoint address is obtained, the tunnel initiator will establish a tunnel connection to the tunnel endpoint device.

FIG. 2 is a protocol stack diagram illustrating an example of the protocol relationships in a conventional tunnel structure. As is known in the art, the Open System Interconnection ("OSI") model is used to describe computer networks. The OSI model consists of seven layers including from lowest-to-highest, a physical, data-link, network, transport, session, application and presentation layer. The physical layer, or layer 1, transmits bits over a communication link. The data link layer, or layer 2, transmits error free frames of data. The network layer, or layer 3, transmits and routes data packets. FIG. 2 illustrates an example of protocol stacks in each of the remote client 20, tunnel initiator 30, and tunnel endpoint 50, and server 84 for tunnel connection 56 of FIG. 1. Link 22-for remote client 20 to tunnel initiator 30 can involve a wireless link protocol, such as the Radio Link Protocol (RLP), a dial-up type protocol, such as the Point-to-Point Protocol (PPP) or Serial Line Interface Protocol (SLIP), a network type protocol, such as the Media Access Control (MAC) protocol of Ethernet, or other types of links as the application demands. Thus, a layer 1 to layer 1 (L1) session is represented at the lowest level of the protocol stacks in FIG. 2 between remote client 20 and tunnel initiator 30. Because the link between the remote client and tunnel initiator is typically a serial link, a serial data link protocol session exists at layer 2 (L2) between remote client 20 and tunnel initiator 30.

When a tunnel is established from tunnel initiator 30 to tunnel endpoint 50, there are layer 1 (L1) and layer 2 (L2) sessions between the tunnel servers as well as a L2TP session that represents the tunnel connection 56 itself. Once the tunnel connection is established, a session between network layer peers, such as internet protocol (IP) peers, in the remote client 20 and tunnel endpoint 50 typically exists. A session also typically exists between transport layer peers in the remote client 20 and the server 84. Transport layer protocols such as Transmission Control Protocol ("TCP") and User Datagram Protocol ("UDP") are often used over IP in computer networks. The Transmission Control Protocol provides a connection-oriented, end-to-end reliable protocol designed to fit into a layered hierarchy of protocols that support multi-network applications. The User Datagram Protocol provides a transaction oriented datagram protocol, where delivery and duplicate packet protection are not guaranteed.

A second IP (IP2) and UDP (UDP2) peer relationship exists for the routing of packets over the network 70 between the tunnel initiator 30 and the tunnel endpoint 50. In addition, a PPP peer relationship typically exists between the remote client 20 and the tunnel endpoint 50, where the PPP packets become the payload for the tunnel connection between the tunnel initiator 30 and tunnel endpoint 50. PPP is described in further detail in RFC 1661, herein incorporated by reference for all purposes.

Occasionally, a tunnel connection is desired between a remote client and a server where a tunnel initiator serving the remote client and a tunnel initiator serving the server reside on different types of networks. FIG. 3 is a functional block diagram illustrating an architecture 100 where tunnel initiator 30 resides on IP network 70 and tunnel endpoint 150 serving server 84 resides on Asynchronous Transfer Mode (ATM) network 160. A gateway device 140 is configured to recognize address on both the IP network 70 and the ATM network 160 and route traffic between the two networks.

In order to tunnel traffic between remote client 20 and server 84, two tunnel connections must be established: a first tunnel 134 from tunnel initiator 30 to gateway 140 and a second tunnel 148 from gateway 140 to tunnel endpoint 150. When tunnel initiator 30 queries AAA server for the endpoint device fore remote client 20, the AAA server returns an address for tunnel endpoint 150 on ATM network 160. The routing tables established for IP network 70 will return an address for gateway 140 on IP network 70 as the next hop for traffic to the address for tunnel endpoint 150. Tunnel connection 134 is then established from tunnel initiator 30 to gateway 140.

When gateway 140 receives tunneled packets via tunnel connection 134 that are addressed to tunnel endpoint device 150. The gateway device then establishes tunnel 148 through ATM network 160 to tunnel endpoint 150. Tunnel packets from remote client 20 are sent through tunnel connection 134 to gateway device 140. Gateway device 140 takes the packets received through tunnel 134, de-tunnels the packets, re-tunnels the packets for tunnel connection 148, and retransmits the re-tunneled packets through tunnel 148 to tunnel endpoint 150.

FIG. 4 is a protocol stack diagram illustrating an example of the protocol stacks resulting from tunnel connections 134 and 148 in architecture 100 of FIG. 3. After tunnel connections 134 and 148 are established, a data packet sent from remote client 20 to tunnel initiator 30 over link 22 is passed up to an L2TP peer in tunnel initiator 30 for a first L2TP connection (L2TP1), which sends the packet through tunnel connection 134 to the corresponding L2TP1 peer in gateway 140. A second IP session (IP2) and second UDP session (UDP2) for tunnel connection 134 through IP network 70 originate in tunnel initiator 30 and terminate in gateway 140. As the packet passes through the layers L2TP1, IP2 and UDP2 on the left-hand side of the stack for gateway 140, the packet headers for these layers are stripped away. Once the packet reaches the top of the stack shown for gateway 140, it has been de-tunneled from tunnel connection 134.

At this point, the packet must be re-tunneled for tunnel connection 148. The packet travels down the right-hand side of the stack for gateway 140. The packet passes down through a a second L2TP session (L2TP2) corresponding to the second tunnel connection 148. The packet is thus re-tunneled for tunnel connection 148. The packet then passes into an ATM stack entity that will route packets based upon virtual path identifier (VPI) and virtual channel identifier (VCI) values through ATM network 160.

When the packet reaches tunnel endpoint 150 on ATM network 160, the packet is passed up through the L2TP2 layer and IP2 layers of the tunnel endpoint 150 stack in order to de-tunnel the packet from tunnel connection 148. The packet is then forwarded to server 84 over LAN 80.

The processing involved in de-tunneling and re-tunneling packets represents a significant load upon the resources of gateway device 140. This processing also introduces delay in the transmission of packets from tunnel initiator 30 to tunnel endpoint 150.

Thus, the need remains for a method for efficiently transporting tunnel packets across multiple networks of different types.

SUMMARY OF THE INVENTION

In accordance with preferred embodiments of the present invention, some of the problems associated with combining multiple tunnel endpoint devices are overcome.

An embodiment of a method, according to the present invention, for method for establishing a tunnel connection from a tunnel initiator device on a first network of a first type and a tunnel endpoint device on a second network of a second type, calls for providing a translator device coupled to the first and second networks and includes receiving a connection request message in the translator device from the tunnel initiator, the connection request message including a source address field having a first address value corresponding to the tunnel initiator, a source tunnel identifier field having a first tunnel identifier value, and a host name field having a desired host name value. The method then proceeds by resolving the desired host name value to a second address value corresponding to the tunnel endpoint, creating a data entry accessible to the translator device and having first and second address columns and first and second tunnel identifier columns, and storing the first address value in the first address column of the data entry, the first tunnel identifier value in the first tunnel identifier column of the data entry, and the second address value in the second address column of the data entry. The method then sets forth inserting the second address value from the second address column of the data entry into the destination address field of the connection request message and re-transmitting the connection set-up request onto the second network. The method then calls for receiving a connection reply message in the translator device, the connection reply message including a source address field having the second address value, a source tunnel identifier field having a second tunnel identifier value, and a destination tunnel identifier field having the first tunnel identifier value, using the second address value from the source address field and the first tunnel identifier value from the destination tunnel identifier field of the connection reply message to find the matching data entry having the second address value in the second address column and the first tunnel identifier column, respectively, and storing the second tunnel identifier value in the second tunnel identifier column of the data entry. The method then proceeds by inserting the first address value from the first address column into the destination field of the connection reply message and re-transmitting the connection reply message onto the first network.

The foregoing and other features and advantages of a preferred embodiment of the present invention will be more readily apparent from the following detailed description, which proceeds with references to the accompanying drawings.

BRIEF DESCRIPTION OF THE DRAWINGS

The present invention is described in the context of an embodiment of the invention with reference to the following drawings, wherein.

DETAILED DESCRIPTION OF PREFERRED EMBODIMENTS

The present invention is directed toward a method and architecture for transmitting packets over tunnel connections that span multiple networks of different types.

Figure 1:
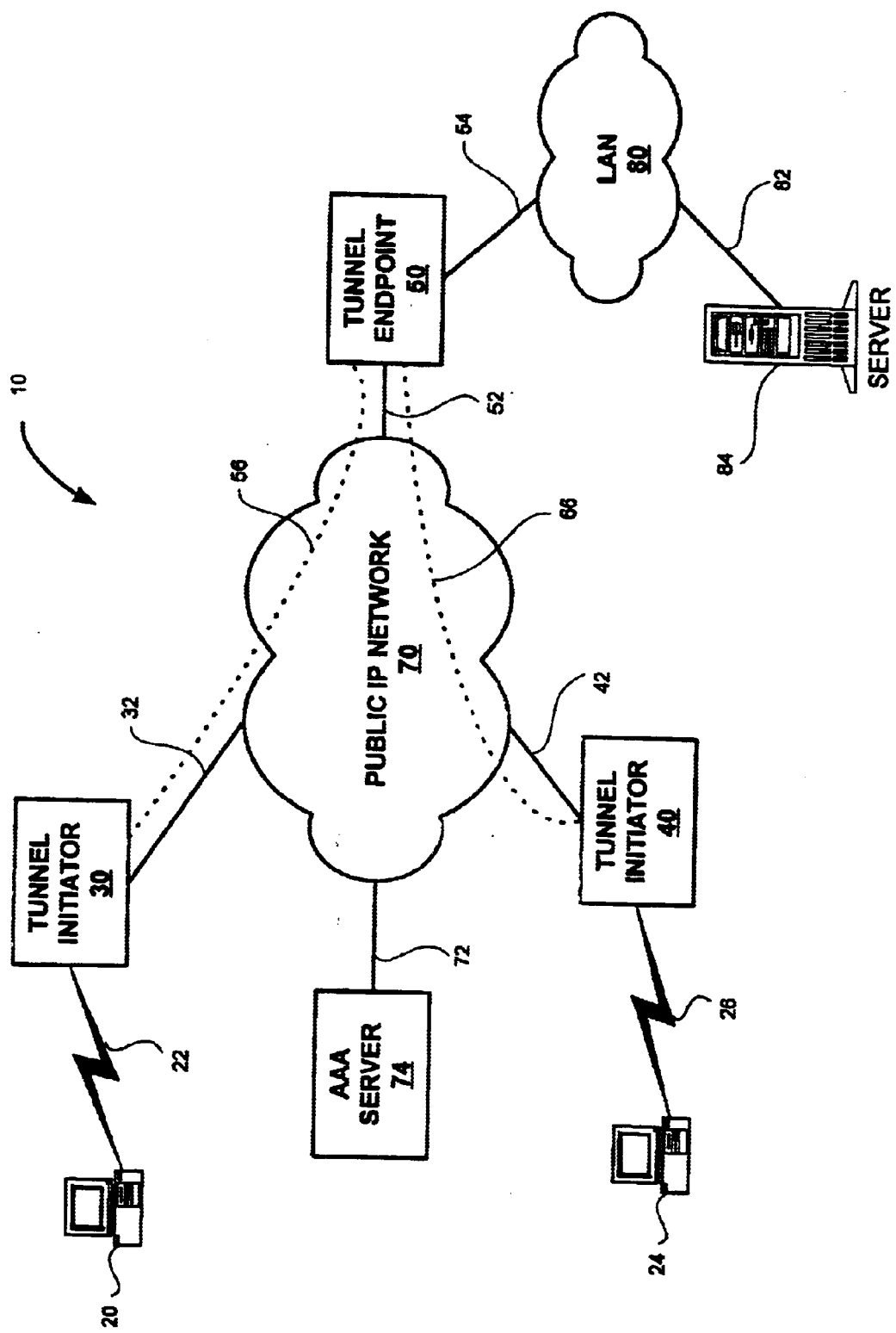
FIG. 1 is a functional block diagram illustrating a network architecture having two prearranged tunnel connections that terminate on different endpoint devices.
Figure 2:
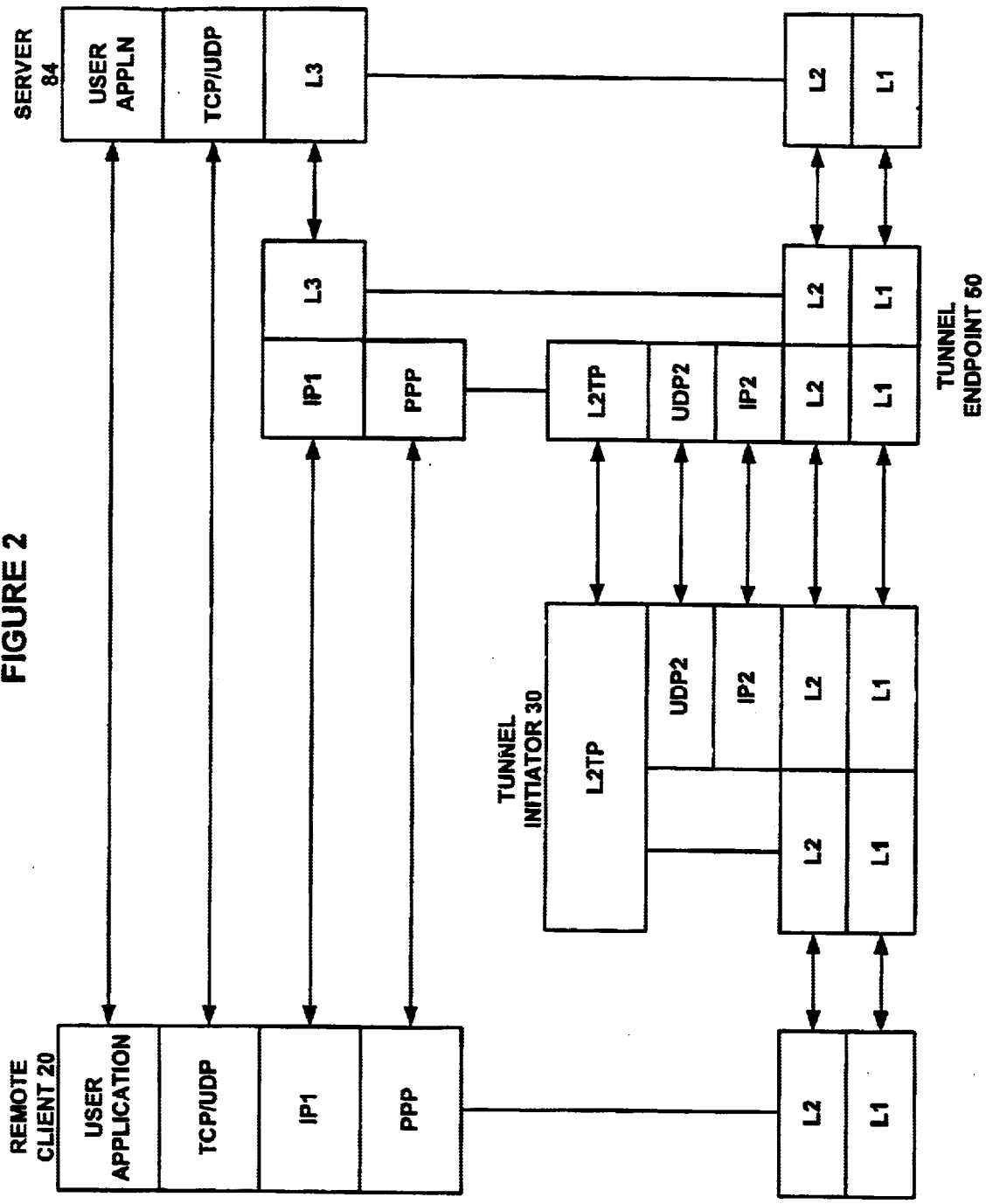
FIG. 2 is a functional block diagram illustrating a network architecture according to an embodiment of the present invention having two prearranged tunnel connections that terminate on a single endpoint device, where a database device is directly coupled to the network.
Figure 3:
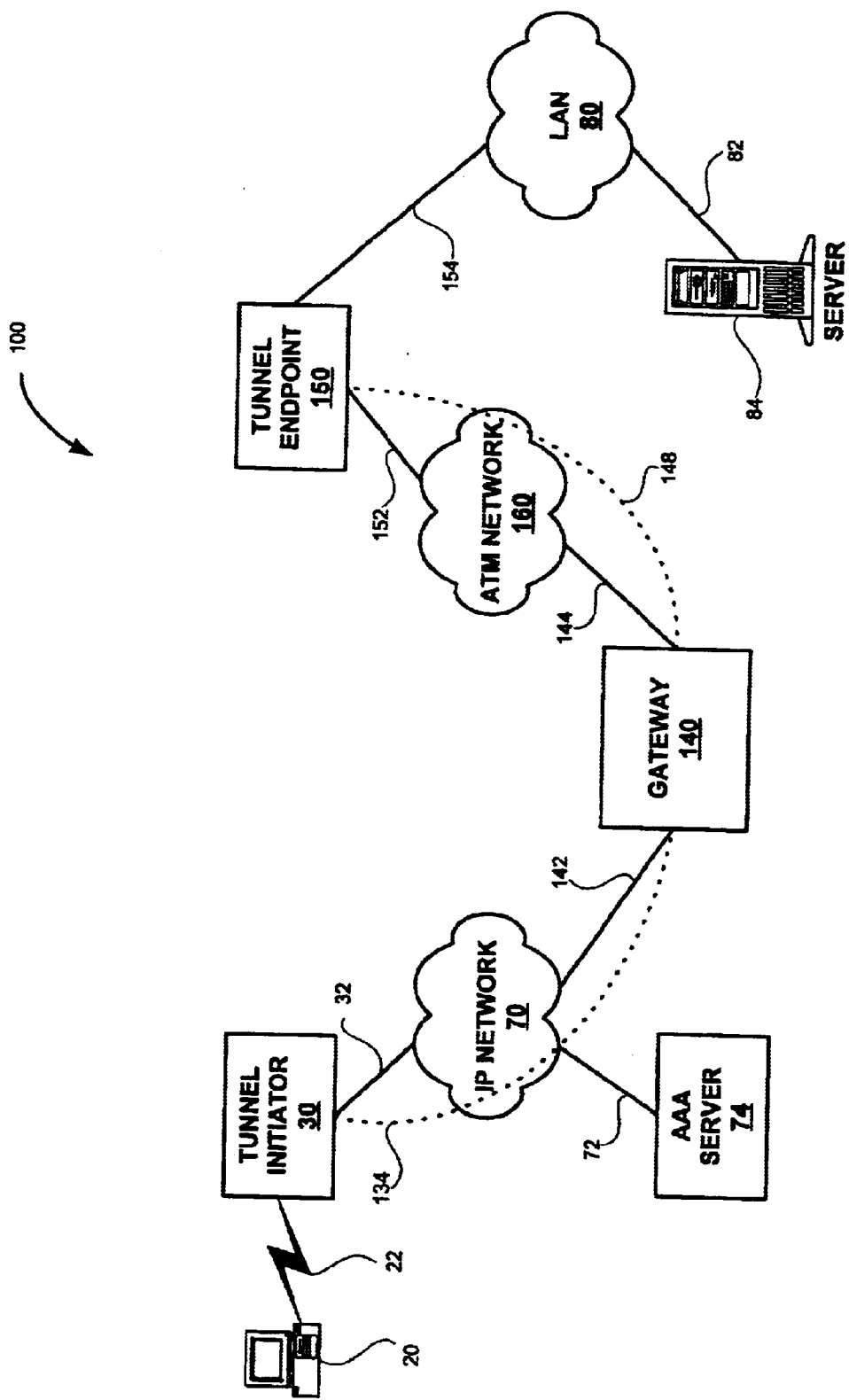
FIG. 3 is a functional block diagram illustrating another network architecture according to an embodiment of the present invention, where the database is locally connected to a tunnel initiator.
Figure 4:
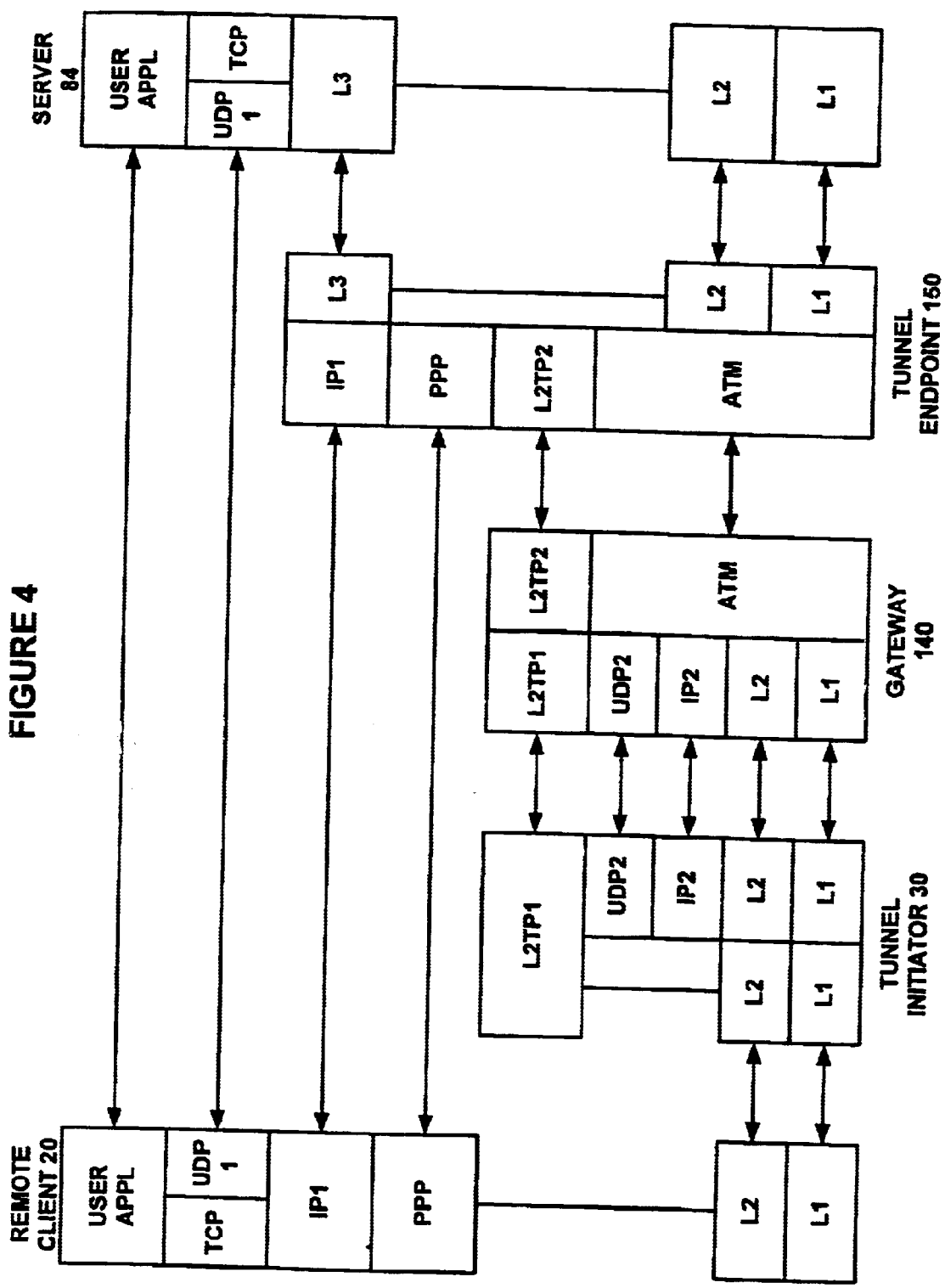
FIG. 4 is a functional block diagram illustrating yet another network architecture according to an embodiment of the present invention, where the database is locally shared to a cluster of tunnel initiators.
Figure 5:
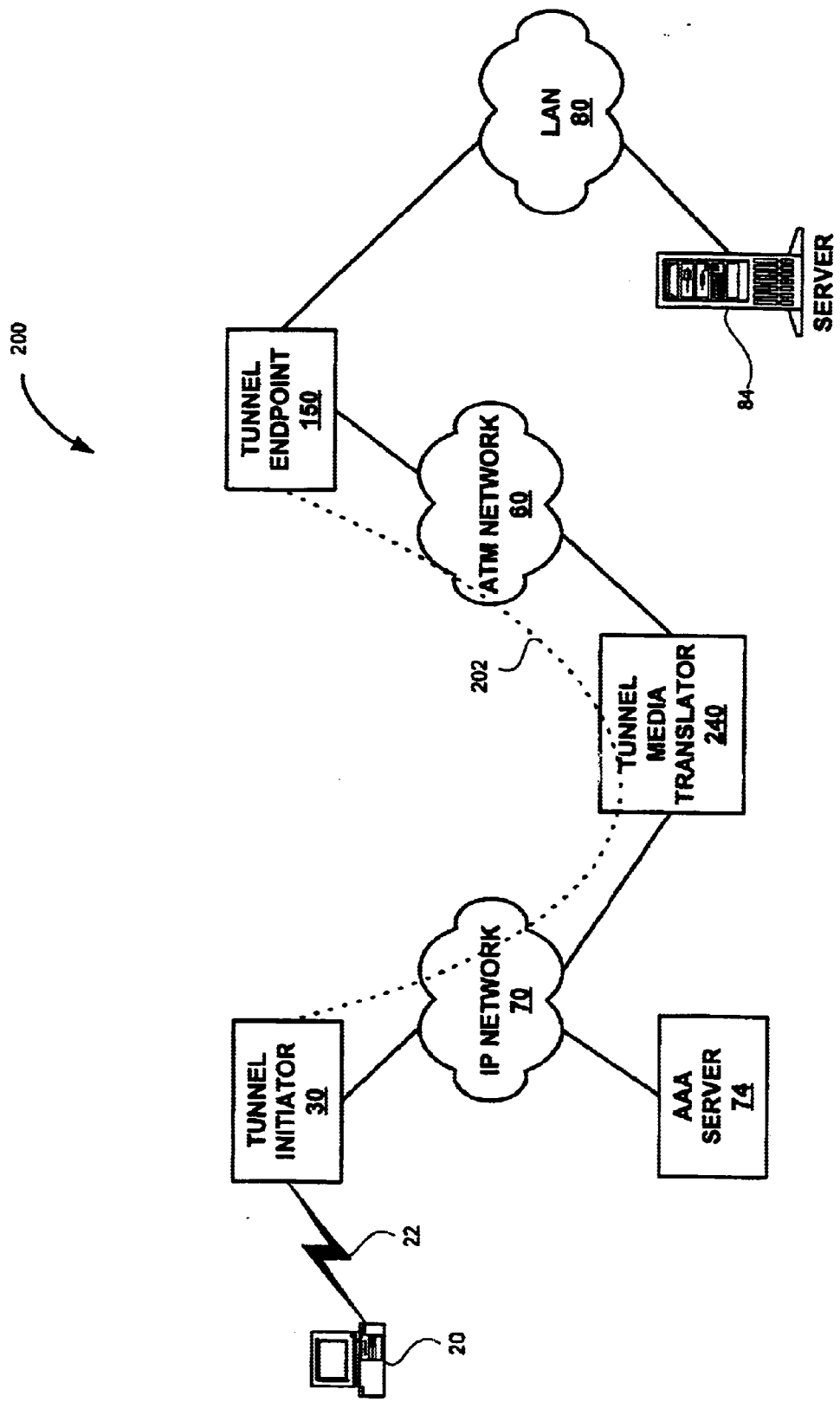
FIG. 5 is a message sequence scenario illustrating an example of message traffic according to an embodiment of the present invention when a client call is received for which there is no database entry.

FIG. 5 is a functional block diagram illustrating an embodiment of a network architecture 200 that supports a tunnel connection 202 that spans two networks of different types, i.e. IP network 70 and ATM network 60. The architecture 200 of FIG. 5 is similar to the architecture 100 of FIG. 3, except that a tunnel media translator device 240 according to the present invention takes the place of the gateway device 40 in FIG. 3.

Tunnel media translator 240 maps tunnel packets from tunnel initiator 30 received through IP network 70 to tunnel endpoint 150 over ATM network 60 without de-tunneling and re-tunneling packets. When remote client 20 establishes link 22 to tunnel initiator 30, the remote client 20 will provide a user name to tunnel initiator 30. Tunnel initiator 30 will make a Domain Name System (DNS) call, or similar type of call, to a DNS server, which, in the present example, is integrated into AAA server 74, where the DNS call includes the host name requested by remote client 20. AAA server 74 will reply with a next hop address on IP network 70 for the host name requested by remote client 20. The next hop address will be the address of tunnel media translator 240 on IP network 70.

Figure 6:
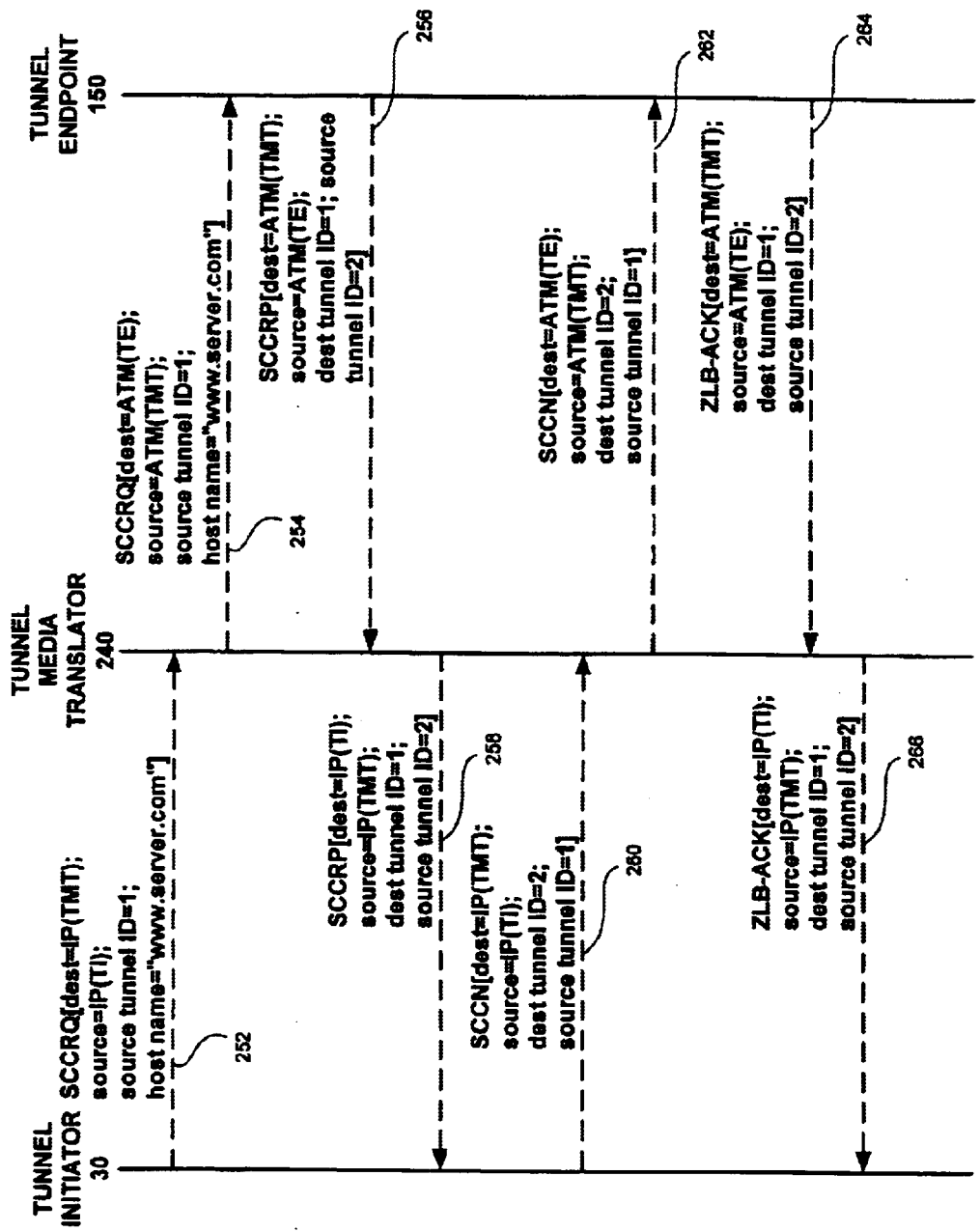
FIG. 6 is a message sequence scenario illustrating an example of message traffic according to an embodiment of the present invention when a client call is received and there is a matching database entry.

Using the IP network 70 address for tunnel media translator 240 returned in response to the DNS call, tunnel initiator 30 sends a Start-Control-Connection-Request (SCCRQ) message to tunnel media translator 240 to initiate establishment of a tunnel connection, as shown in the message sequence diagram of FIG. 6. The SCCRQ message 252 will include the IP network 70 address for tunnel initiator 30, i.e. IP(TI), in a source address field, a tunnel identifier value assigned to the tunnel connection 202 by the tunnel initiator 30 in a source tunnel ID field, i.e. source tunnel ID=1, and the host name identifier or system identifier for the endpoint requested by the user of remote client 20, i.e. host name="www.server.com". In the present example, the endpoint for tunnel connection 202 requested by the user corresponds to tunnel endpoint 150.

Host names and system identifiers can be defined under a variety of systems. The DNS is defined in RFC 1034 and RFC 1035, herein incorporated by reference, and is a mechanism for translating names of host computers into addresses in IP networks. The DNS is incorporated into a distributed database system that, when queried with a host name, such as www.3com.com, will return a network address corresponding to the host name. Other systems, such as Dialup Number Information System (DNIS) or Automatic Number Identification (ANI), may be adaptable, in some applications, to also provide host addresses corresponding to host names or system identifiers.

Tunnel media translator 240 is pre-configured with a static table entry that maps a host name to a second medium address, i.e. an address on ATM network 60. Table 1 below illustrates an example of the static table entry. The first field of the static table entry contains a host name or system identifier. The second field of the static table entry contains an address on the second medium, i.e. ATM network 60, to which the tunnel media translator 240 provides access.

TABLE 1

| HOST NAME | SECOND MEDIUM ADDRESS |
|---|---|
| Host name requested by remote client. | Address of tunnel endpoint 150 on ATM network 60. |

Figure 7A:
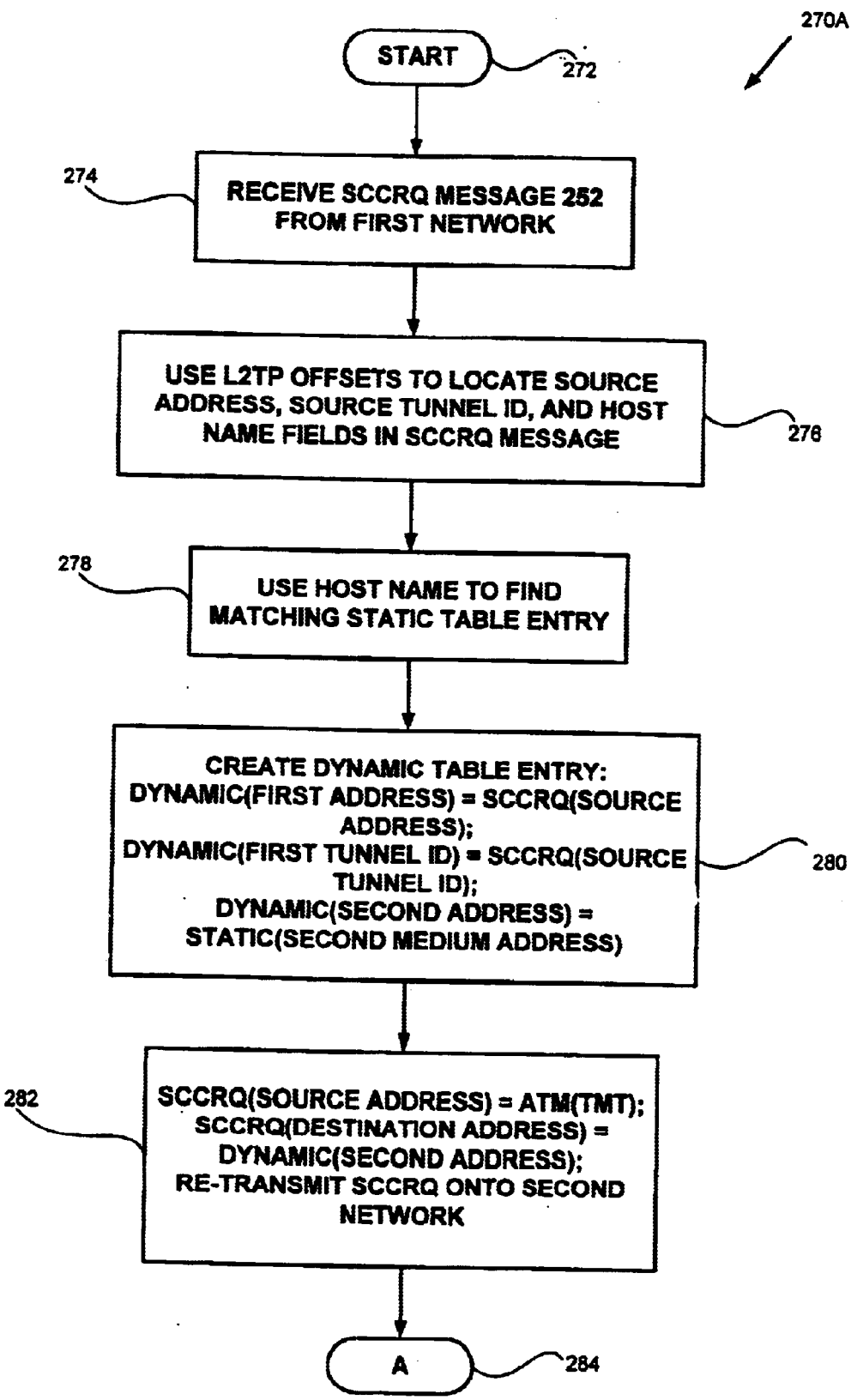
FIG. 7 is a message sequence scenario illustrating an example of message traffic according to an embodiment of the present invention based upon multicasting when a client call is received and there is a matching database entry.
Figure 7B:
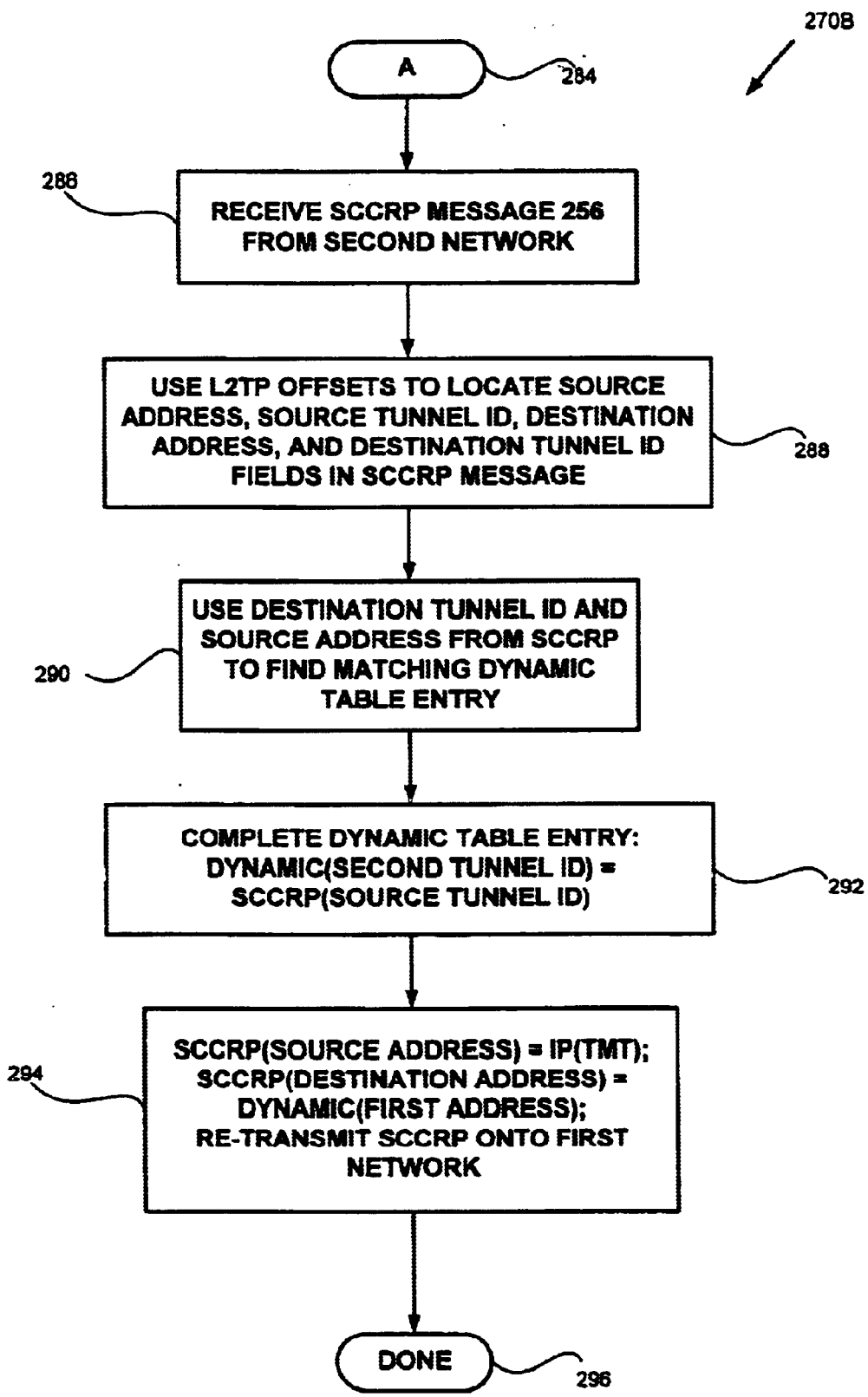

When tunnel media translator 240 receives the SCCRQ message 252 from tunnel initiator 30, it will populate a dynamic table entry for the tunnel connection. FIGS. 7A and 7B illustrate an embodiment of a process 270A and 270B for populating a dynamic table entry in the tunnel media translator 240. In the process of FIG. 7A, translator 240 receives SCCRQ message 252 at step 274. Using L2TP offsets, the translator locates the source address, source tunnel ID and hose name fields in the SCCRQ message at step 276. At step 278, the value in the host name field of SCCRQ message 252 is used to find a static table entry matching the host name provided by the user of remote client 20. The matching static table entry is shown in Table 1 above.

The translator 240 will create a dynamic table entry that will contain the information needed for tunnel connection 202, as shown in Table 2 below. At this point, translator 240 has received the tunnel ID value and the address of tunnel initiator 30 from the source tunnel ID field and the source address field, respectively, of the SCCRQ message 252. At step 280, the source address and source tunnel ID values from SCCRQ message 252 are placed into the first address and first tunnel identifier columns of the dynamic table entry. The translator 240 also has the address on ATM network 60 for tunnel endpoint 150 from the static table entry, which is also placed in the second address column of the dynamic table entry at step 280.

and inserts the address into the destination address field of the SCCRP message. Tunnel media translator 240 then transmits the modified SCCRP message 258 onto IP network 70 at step 294.

In response to the SCCRP message 258, tunnel initiator 30 sends a Start-Control-Connection-Connected (SCCN) message 260. The SCCN message 260 is received by tunnel media translator 240, which inserts the ATM address for tunnel endpoint 150 into a destination field of the SCCN message and transmits modified SCCN message 262 to

TABLE 2

| FIRST TUNNEL IDENTIFIER (for tunnel initiator) | SECOND TUNNEL IDENTIFIER (for tunnel endpoint) | FIRST ADDRESS (for tunnel initiator on first network) | SECOND ADDRESS (for tunnel endpoint on second network) |
| --- | --- | --- | --- |
| Value from source tunnel ID field of SCCRQ. | Value from source tunnel ID field of SCCRP. | Address value from source address field of SCCRQ (e.g. address of tunnel initiator 30 on IP network 70). | Address value from second medium address field of static table entry (e.g. address of tunnel endpoint 150 on ATM network 60). |

At step 282, tunnel media translator 240 inserts the value of the second address column of the dynamic table, i.e. the address on ATM network 60 for tunnel endpoint 150 shown in the diagram or destination=ATM(TE), into the destination address field of the SCCRQ message. The translator 240 also inserts its address on ATM network 60 into the source address field of the SCCRQ message, i.e. source=ATM (TMT). The modified SCCRQ message 254 is then transmitted onto ATM network 60.

When tunnel endpoint 150 receives the SCCRQ message 254, it establishes an L2TP peer for its end of tunnel connection 202. Tunnel endpoint 150 also formats a connection set-up reply (SCCRP) message 256 for transmission back to the tunnel initiator. Tunnel endpoint 150 places its address on ATM network 60 into a source address field of the SCCRP and selects its own tunnel identifier value for tunnel connection 202 that it inserts into a source tunnel identifier field of the SCCRP. In addition, tunnel endpoint 150 places the address value from the source address field of the SCCRQ, which is the address on ATM network 60 for translator 240, i.e. ATM(TMT), into a destination address field of the SCCRP. Tunnel endpoint 150 also inserts a value from the source tunnel identification field of the SCCRQ into a destination tunnel identification field of the SCCRP. The tunnel endpoint device 150 then transmits the SCCRP message 256 onto ATM network 60.

Tunnel translator 240 receives the SCCRP message 256 from tunnel endpoint 150 at step 286 of FIG. 7B. The translator 240 uses the L2TP offsets at step 288 to locate the source address, source tunnel ID, destination address, and destination tunnel ID fields in SCCRP message 256. The translator uses the values from the destination tunnel ID field and the source address field for the SCCRP message 256 to find the matching dynamic table entry. At step 292, the value of the source tunnel identifier field from the SCCRP message is inserted into a second tunnel identifier column of the dynamic table entry. Both ends of tunnel connection 202 are now defined in the dynamic table entry (Table 2) in tunnel media translator 240.

The tunnel media translator 240 inserts the value from the first address column of the matching dynamic table entry, which is the address on IP network 70 for tunnel initiator 30, tunnel endpoint 150 over ATM network 60. At this point, the control connection for tunnel connection 202 is established. If no messages for remote 20 are waiting in the queue at tunnel endpoint 150, then a Zero-Length-Body (ZLB) acknowledge message 262 is sent back to tunnel initiator 30 via tunnel media translator 240.

Next, a call session is established for the call originated by remote client 20. The tunnel initiator 30 assigns a session ID value to each call session in order to discriminate between streams on tunnel 202. Each call session corresponds to a single PPP stream between the tunnel initiator 30 and the tunnel endpoint 150. An incoming call establishment message sequence begins with tunnel initiator 30 sending an Incoming-Call-Request (ICRQ) message to tunnel endpoint 150 that includes a call session ID assigned by tunnel initiator 30. Tunnel endpoint 150 responds with an Incoming-Call-Reply (ICRP) message to tunnel initiator 30, which, in turn, sends an Incoming-Call-Connected (ICCN) message to tunnel endpoint 150. If no messages for remote client 20 are waiting in the queue at tunnel endpoint 150, then a Zero-Length-Body (ZLB) acknowledge message 264 is sent back toward tunnel initiator 30 and forwarded by translator 240.

A tunnel connection 202 is now in place between tunnel initiator 30 and tunnel endpoint 150 with a call session for remote client 20. Each data and control packet will contain the tunnel ID and call session ID assigned by the tunnel initiator 30 to differentiate these packets from those of other tunnels and calls that may exist between the tunnel initiator 30 and tunnel endpoint 150.

With tunnel connection 202 established, packets from remote client 20 to server 84 are inserted into tunnel connection 202 by tunnel initiator 30, flow through IP network 70 to tunnel media translator 240, across ATM network 60 to tunnel endpoint 150, where the packets exit the tunnel, and over LAN 80 to server 84.

Figure 8:
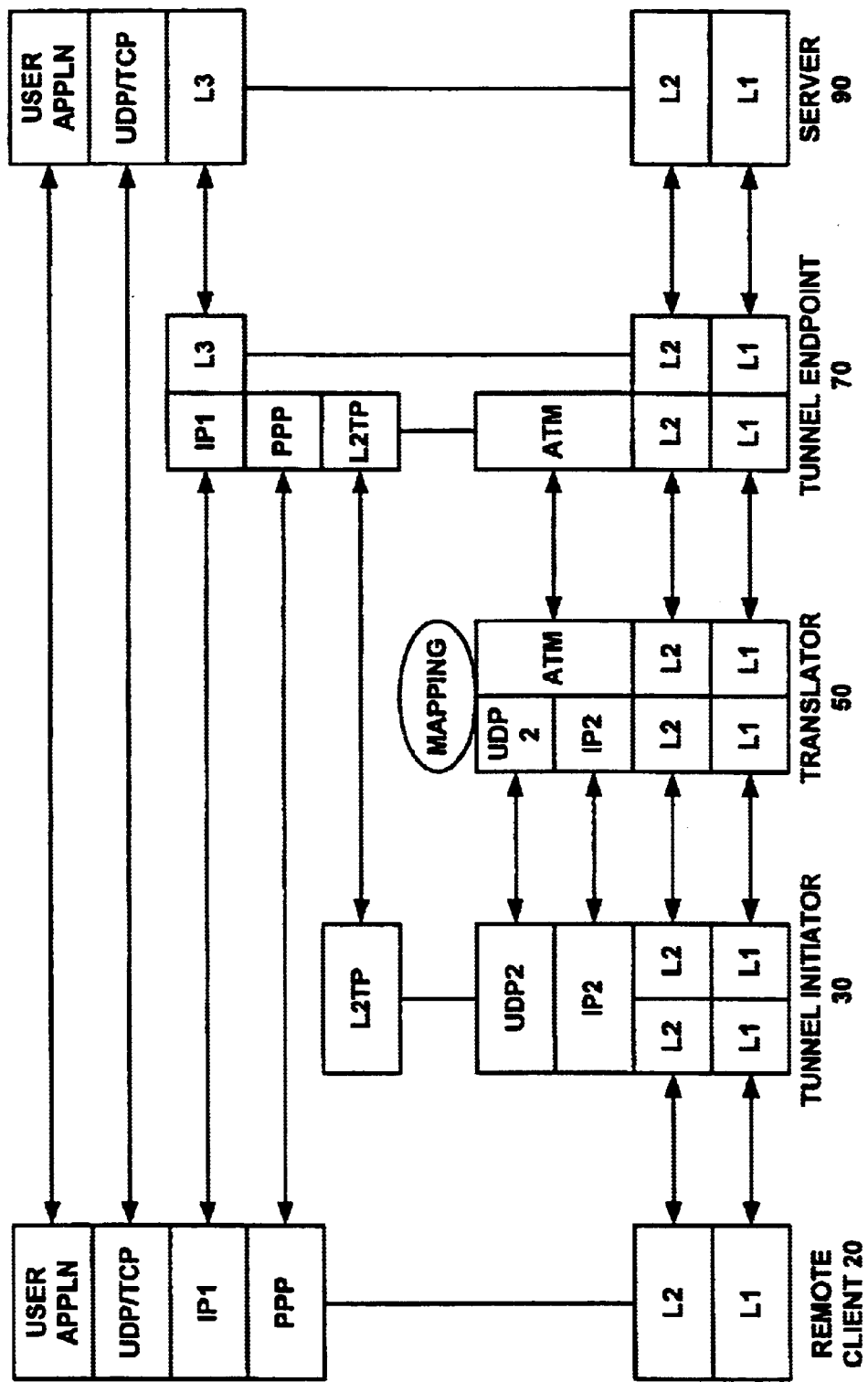
FIG. 8 is a message sequence scenario illustrating an example of message traffic according to an embodiment of the present invention based upon repeated multicasting when a client call is received and there is no matching database entry.

The resulting protocol stacks for the architecture 200 of FIG. 5 are shown in FIG. 8. Tunnel connection 202 passes from an L2TP peer in tunnel initiator 30 to an L2TP peer in tunnel endpoint 150. Tunnel media translator 240 does not contain an L2TP peer because the endpoints of L2TP tunnel connection 202 are in tunnel initiator 30 and tunnel endpoint 150. Instead, a mapping process that is configured with L2TP header offsets and message types in order to enable it to recognize the fields of the L2TP headers of the set-up messages and tunnel packets in tunnel connection 202. The mapping process translates tunnel packets received on IP network 70 into tunnel packets on ATM network 60 without de-tunneling and re-tunneling the packets.

Figure 9:
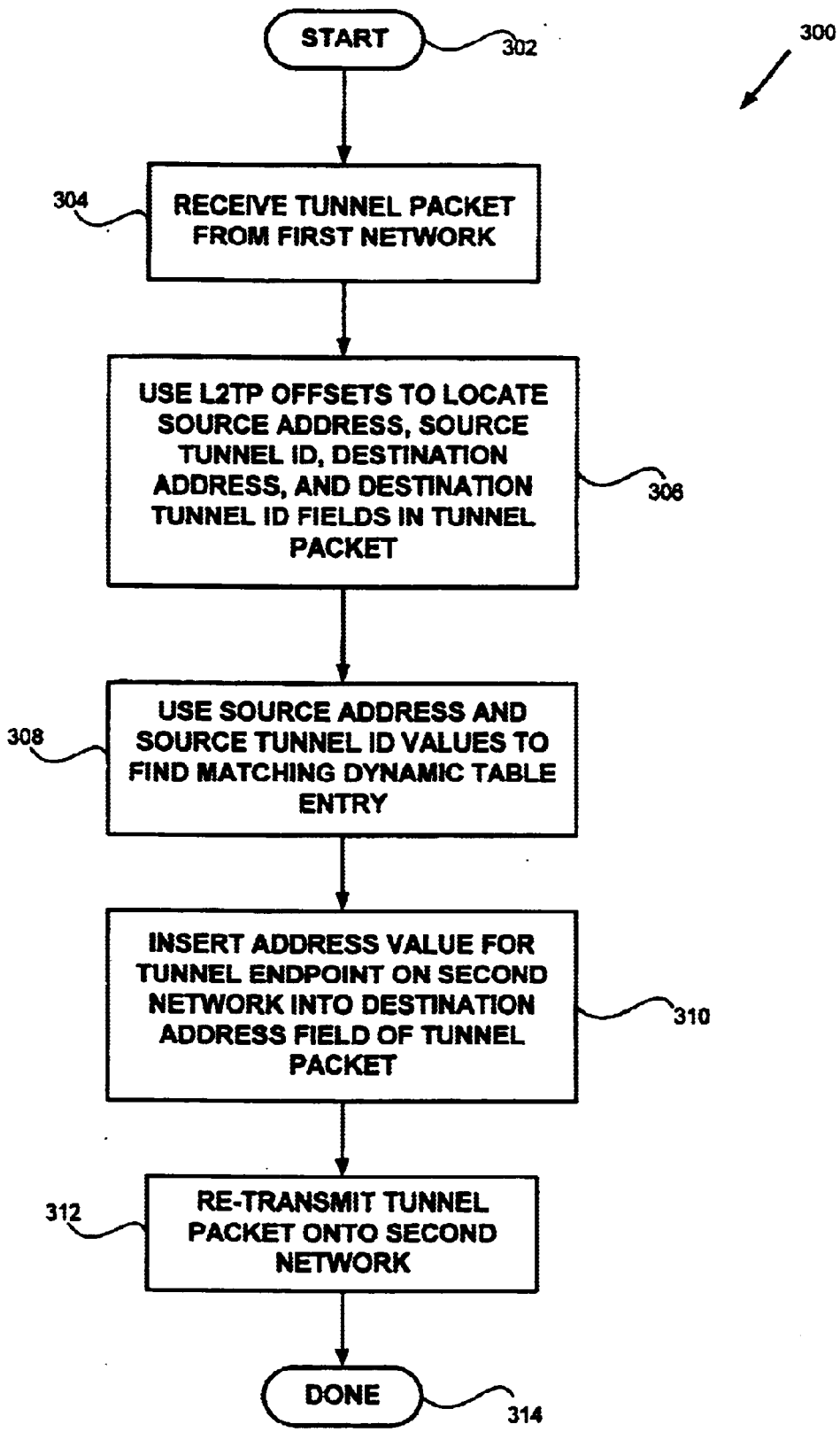
FIG. 9 is a message sequence scenario illustrating an example of message traffic according to an embodiment of the present invention when a call is disconnected.

FIG. 9 is a control flow diagram illustrating an embodiment of the mapping process 300 performed in tunnel media translator 240. Packet translation process 300 is entered when a tunnel packet arrives, at step 304, at translator 240 over a first network, e.g. IP network 70 in the present example. The translator 240 uses L2TP offsets at step 306 to locate the source address, source tunnel ID, destination address, and destination tunnel ID fields of the received tunnel packet. At step 308, translator 240 uses the values from the source address and source tunnel ID fields to find a dynamic table entry having matching values in the first address and first tunnel identifier columns, respectively. At step 310, the address for the tunnel endpoint on the second network, e.g. ATM network 60, is obtained from the second address column of the matching entry and inserted into the destination address field of the received tunnel packet. The received tunnel packet is then re-transmitted to the tunnel endpoint over the second network at step 312.

In effect, the mapping process in translator 240 effectively maps an IP address and UDP port of an IP link to a virtual path identifier (VPI) and virtual channel identifier (VCI) for an ATM network, in the example used above to illustrate the present invention. As one of ordinary skill in the art will appreciate, the tunnel translator according to the present invention may be readily adapted to translate packets between other types of networks.

The embodiment of a tunnel media translator 240, according to the present invention, translates tunnel packets from a tunnel initiator on a first network to a tunnel endpoint on a second network without de-tunneling and re-tunneling the packets. As a result, tunnel packets may pass through the tunnel connection faster because less processing is required using the present invention. In addition, because the packets are not processed by another L2TP peer in the tunnel translator, additional headers for additional peer sessions between the tunnel translator and the tunnel initiator and endpoint are avoided, e.g. the UDP2, eight bytes, and IP2, twenty bytes, headers may be avoided for a savings of at least twenty-eight bytes per packet.

Figure 10:
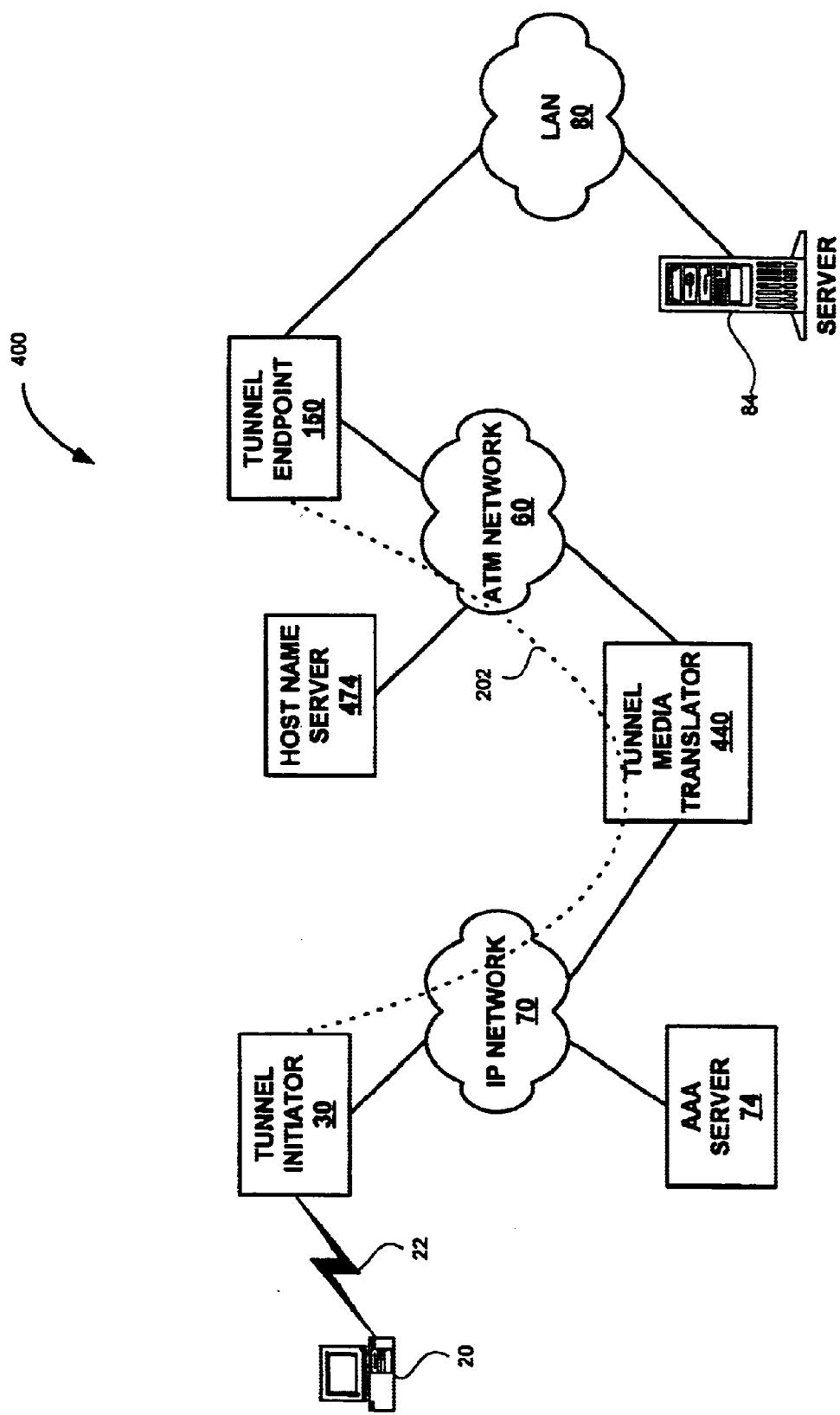
FIG. 10 is a functional block diagram illustrating a mobile network architecture according to an embodiment of the present invention.

Another embodiment of a tunnel translator 440 according to the present invention can populate the dynamic table entry without the need for configuring the static table entry that maps a host name to a second network address. FIG. 10 is a functional block diagram illustrating an architecture 400 suitable for use with this embodiment of the present invention. Architecture 400 is similar to architecture 200 of FIG. 5, but with the substitution of translator 440 for translator 240 and the addition of host name server 474 coupled to ATM network 60. Host name server 474 has a table that is either automatically or statically configured, where entries in table match a host name to a corresponding address on ATM network 60. Typically, these tables are statically configured by a network administrator for ATM network 60, however, systems are now being developed for ATM, and other networks, that operate in a manner similar to DNS servers for IP networks. Tunnel media translator 440 will send a host name resolution (HNR) call, which operates in a manner similar to a DNS call, that contains the host name value. In response to the HNR call, the host name server 474 returns a HNR reply that contains a network address that corresponds to the host name or system identifier in the HNR call. The host name server can reside in a variety of places accessible to translator 440, such as on the ATM network 60 or even within the translator 440 itself.

Figure 11:
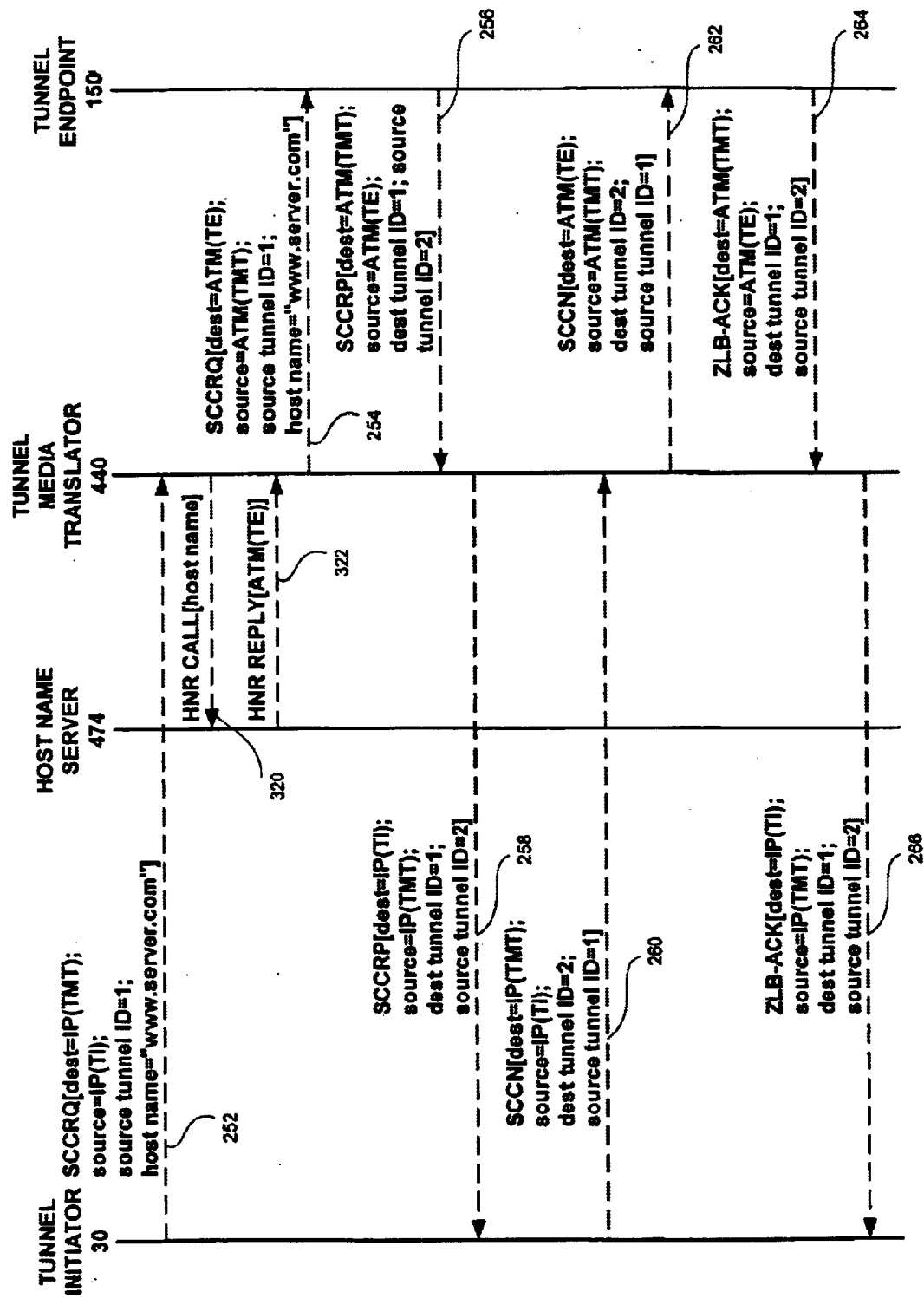
FIG. 11 is a message sequence scenario illustrating an example of message traffic according to an embodiment of the present invention based upon multicasting when a client call from a mobile client is received and there is a matching database.

FIG. 11 is a message sequence diagram illustrating an example of a message scenario involving tunnel media translator 440 and host name server 474 in the process of setting-up tunnel connection 202. The sequence of FIG. 11 is similar to the sequence of FIG. 6 except for the addition of HNR call 320 and HNR reply 322.

Unlike translator 240, translator 440 is not pre-configured with the static table entry. Instead, when translator 440 receives SCCRQ message 256 containing the host name requested by the user of remote client 20, translator 440 inserts the host name into HNR call 320 that is transmitted to host name server 474. Host name server 474 will return an address corresponding to the host name in HNR reply 322. In the present example, host name server 474 maps the host name to the address of tunnel endpoint 150 on ATM network 60, i.e. ATM(TE). Translator 440 will insert the address returned by the host name server 474 into the second network column of the dynamic table entry. The remainder of the set-up for tunnel connection 202 proceeds in the same manner as for the architecture of FIG. 5. Thus, in this embodiment of the present invention, it is unnecessary to pre-configure tunnel media translator 440 with a static table entry for each host name that may be the subject of a tunnel connection.

Figure 12:
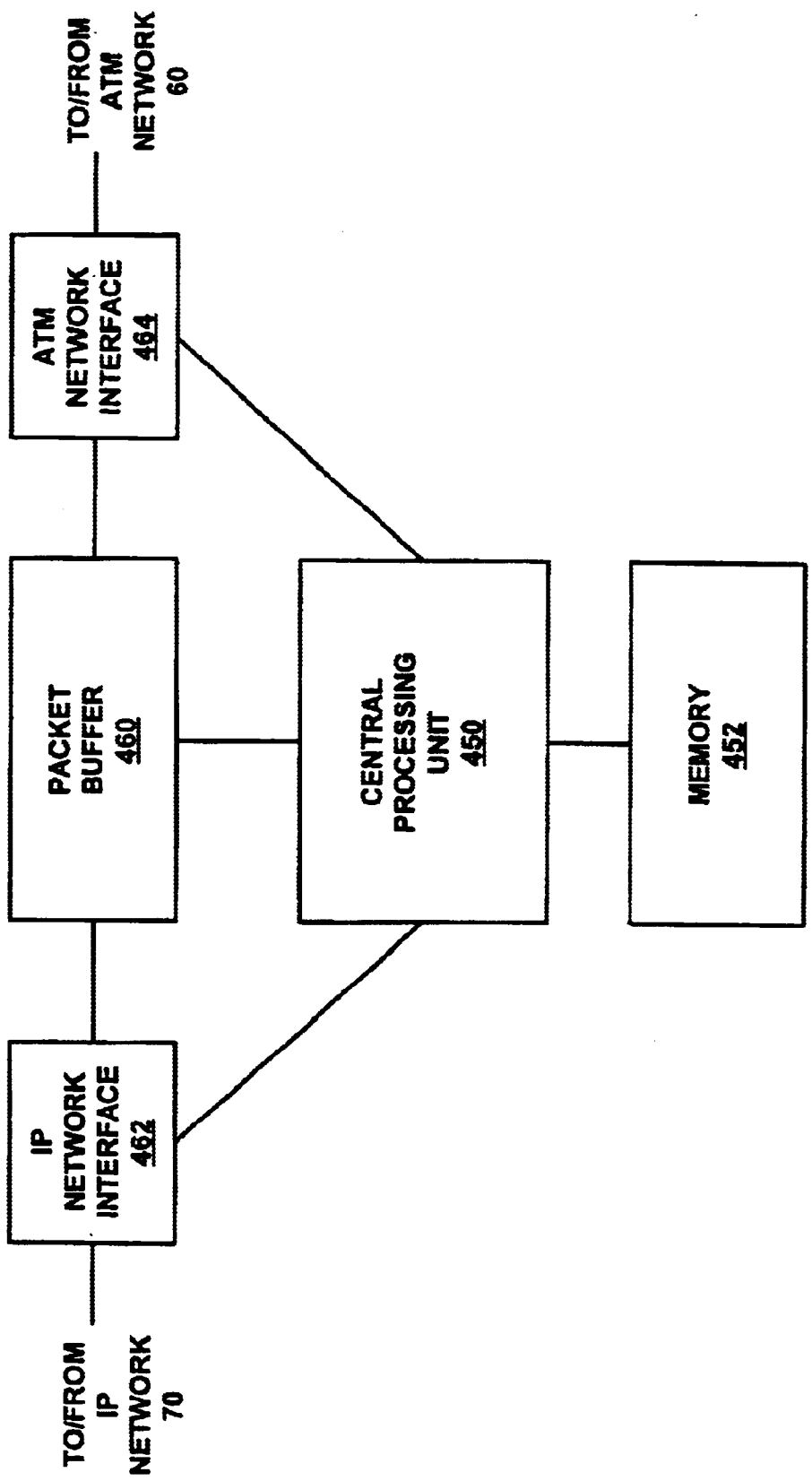
FIG. 12 is a functional block diagram of an embodiment of the tunnel media translator device of FIGS. 5 and 10.

FIG. 12 illustrates a generalized embodiment for tunnel media translator 240 or tunnel media translator 440. In this generalized embodiment, an IP network interface 462 provides for communication with IP network 70, while ATM network interface 464 provides for communication with ATM network 60. Packet buffer 460 buffers the packets received from one network and re-transmitted on another network. Central processing unit (CPU) 450 is connected to packet buffer 460 and can recognize L2TP message types, i.e. SCCRQ, SCCRP, and tunnel packet, and L2TP message fields, such as the destination address field. Through its connection to packet buffer 460, CPU 450 can modify the contents of L2TP message fields in accordance with the present invention. Furthermore, CPU 450 has connections to the IP network interface 462 and ATM network interface 464, through which it receives notification of packet arrival and can control packet re-transmission. CPU 450 is also connected to memory 452, which can store the static and dynamic tables noted above as well as L2TP message type and field offset parameters. The embodiment shown in FIG. 12 is highly generalized and it will be readily appreciated by those of ordinary skill in the art that many system architectures exist that are suitable for use in a tunnel media translator according to the present invention. A more specific example of a device that may be adapted for use in conjunction with the present invention is the network access server described in the patent to Dale M. Walsh et al., U.S. Pat. No. 5,528,595 and manufactured by 3Com Corp. as the Total Control Hub.

The protocol according to the present invention supports the deterministic selection of an endpoint for connections having multiple origination points. Although the present invention is described in the context of an L2TP tunnel, the present invention is applicable to any communications link where it is desirable to provide for point-to-point connections that span multiple networks having different types.

It should be understood that the programs, processes, methods, systems and apparatus described herein are not related or limited to any particular type of computer apparatus (hardware or software), unless indicated otherwise. Various types of general purpose or specialized computer apparatus may be used along with the present invention or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, variations may be made in the message flow scenarios other than those described, and more or fewer elements or components may be used in the block diagrams. In addition, the present invention can be practiced with software, hardware, or a combination thereof The claims should not be read as limited to the described order or elements unless stated to that effect. Therefore, all embodiments that come within the scope and spirit of the following claims and equivalents thereto are claimed as the invention.

We claim:

1. A method for establishing a tunnel connection from a tunnel initiator device on a first network of a first type and a tunnel endpoint device on a second network of a second type, the method comprising the steps of:

providing a translator device coupled to the first and second networks;

receiving a connection request message in the translator device from the tunnel initiator, the connection request message including a source address field having a first address value corresponding to the tunnel initiator, a source tunnel identifier field having a first tunnel identifier value, and a host name field having a desired host name value;

resolving the desired host name value to a second address value corresponding to the tunnel endpoint;

creating a data entry accessible to the translator device and having first and second address columns and first and second tunnel identifier columns;

storing the first address value in the first address column of the data entry, the first tunnel identifier value in the first tunnel identifier column of the data entry, and the second address value in the second address column of the data entry;

inserting the second address value from the second address column of the data entry into the destination address field of the connection request message;

re-transmitting the connection set-up request onto the second network;

receiving a connection reply message in the translator device, the connection reply message including a source address field having the second address value, a source tunnel identifier field having a second tunnel identifier value, and a destination tunnel identifier field having the first tunnel identifier value;

using the second address value from the source address field and the first tunnel identifier value from the destination tunnel identifier field of the connection reply message to find the matching data entry having the second address value in the second address column and the first tunnel identifier column, respectively;

storing the second tunnel identifier value in the second tunnel identifier column of the data entry;

inserting the first address value from the first address column into the destination field of the connection reply message; and re-transmitting the connection reply message onto the first network.

2. The method of claim 1, the method further including the steps of:

receiving a connection connected message in the translator device from the tunnel initiator, the connection connected message including a source address field having the first address value corresponding, a source tunnel identifier field having the first tunnel identifier value, and a destination tunnel identifier field having the second tunnel identifier value;

using the first address value from the source address field and the first tunnel identifier value from the source tunnel identifier field of the connection connected message to find the matching data entry having the first address value in the first address column and the first tunnel identifier column, respectively;

inserting the second address value from the second address column of the data entry into the destination address field of the connection connected message; and re-transmitting the connection connected message onto the second network.

3. The method of claim 1, the method further including the steps of:

receiving a tunnel packet in the translator device from the tunnel initiator, the tunnel packet including a source address field having the first address value corresponding, a source tunnel identifier field having the first tunnel identifier value, and a destination tunnel identifier field having the second tunnel identifier value;

using the first address value from the source address field and the first tunnel identifier value from the source tunnel identifier field of the tunnel packet to find the matching data entry having the first address value in the first address column and the first tunnel identifier column, respectively;

inserting the second address value from the second address column of the data entry into the destination address field of the tunnel packet; and re-transmitting the tunnel packet onto the second network.

4. The method of claim 1, the method further comprising the step of providing a pre-configured data entry having a first column containing the desired host name value and a second column containing the second address value, and where the step of resolving the desired host name value further comprises:

using the desired host name value from the host name field of the connection request message, searching for the matching pre-configured data entry having the desired host name value in the first column; and retrieving the second address value from the second column of the pre-configured data entry.

5. The method of claim 1, where the step of resolving the desired host name value further comprises:

sending a host name resolution service query having the desired host name value from the host name field of the connection request message; and receiving a host name resolution service reply responsive to the host name resolution service query, the host name resolution service reply including the second address value corresponding to the desired host name value.

6. The method of claim 1, where:

the step of inserting the second address value into the destination field of the connection request message further includes inserting a third address value into the source address field of the connection request, where the third address value corresponds to the translator device; and the step of inserting the first address value from the first address column into the destination field of the connection reply message further includes inserting the third address value into the source address field of the connection reply message.

7. The method of claim 1, where:

the first address value includes a network layer address portion and a transport layer port identifier portion; and the second address value includes a virtual path identifier portion and a virtual channel identifier portion.

8. A computer readable medium containing code configured to execute the steps of claim 1.

9. A tunnel media translator device for establishing a tunnel connection from a tunnel initiator device on a first network of a first type and a tunnel endpoint device on a second network of a second type, the translator device comprising:

means for receiving a connection request message in the translator device from the tunnel initiator, the connection request message including a source address field having a first address value corresponding to the tunnel initiator, a source tunnel identifier field having a first tunnel identifier value, and a host name field having a desired host name value;

means for resolving the desired host name value to a second address value corresponding to the tunnel endpoint;

means for creating a data entry accessible to the translator device and having first and second address columns and first and second tunnel identifier columns;

means for storing the first address value in the first address column of the data entry, the first tunnel identifier value in the first tunnel identifier column of the data entry, and the second address value in the second address column of the data entry;

means for inserting the second address value from the second address column of the data entry into the destination address field of the connection request message;

means for re-transmitting the connection set-up request onto the second network;

means for receiving a connection reply message in the translator device, the connection reply message including a source address field having the second address value, a source tunnel identifier field having a second tunnel identifier value, and a destination tunnel identifier field having the first tunnel identifier value;

means for using the second address value from the source address field and the first tunnel identifier value from the destination tunnel identifier field of the connection reply message to find the matching data entry having the second address value in the second address column and the first tunnel identifier column, respectively;

means for storing the second tunnel identifier value in the second tunnel identifier column of the data entry;

means for inserting the first address value from the first address column into the destination field of the connection reply message; and means for re-transmitting the connection reply message onto the first network.

10. A tunnel media translator device according to claim 9, the device further comprising:

means for receiving a connection connected message in the translator device from the tunnel initiator, the connection connected message including a source address field having the first address value corresponding, a source tunnel identifier field having the first tunnel identifier value, and a destination tunnel identifier field having the second tunnel identifier value;

means for using the first address value from the source address field and the first tunnel identifier value from the source tunnel identifier field of the connection connected message to find the matching data entry having the first address value in the first address column and the first tunnel identifier column, respectively;

means for inserting the second address value from the second address column of the data entry into the destination address field of the connection connected message; and means for re-transmitting the connection connected message onto the second network.

11. A tunnel media translator device according to claim 9, the device further comprising:

means for receiving a tunnel packet in the translator device from the tunnel initiator, the tunnel packet including a source address field having the first address value, a source tunnel identifier field having the first tunnel identifier value, and a destination tunnel identifier field having the second tunnel identifier value;

means for using the first address value from the source address field and the first tunnel identifier value from the source tunnel identifier field of the tunnel packet to find the matching data entry having the first address value in the first address column and the first tunnel identifier column, respectively;

means for inserting the second address value from the second address column of the data entry into the destination address field of the tunnel packet; and means for re-transmitting the tunnel packet onto the second network.

12. A tunnel media translator device according to claim 9, the device further comprising:

means for providing a pre-configured data entry having a first column containing the desired host name value and a second column containing the second address value; and where the means for resolving the desired host name value further comprises:

means for using the desired host name value from the host name field of the connection request message, searching for the matching pre-configured data entry having the desired host name value in the first column; and means for retrieving the second address value from the second column of the pre-configured data entry.

13. A tunnel media translator device according to claim 9, where the means for resolving the desired host name value further comprises:

means for sending a host name resolution service query having the desired host name value from the host name field of the connection request message; and means for receiving a host name resolution service reply responsive to the host name resolution service query, the host name resolution service reply including the second address value corresponding to the desired host name value.

14. A communication system for establishing a communication link, the system comprising:

a first network having a first protocol type;

a first network device coupled to the first network, the first network device being configured to transmit a connection request message onto the first network, the connection request message including a source address field having a first address value corresponding to the first network device, a source tunnel identifier field having a first tunnel identifier value selected by the first network device, a destination address field having a second address value, and a host name field having a desired host name value;

a second network having a second protocol type;

a second network device coupled to the second network and having a third address value, the second network device being configured to receive the connection request message and, responsive thereto, select a second tunnel identifier value, format a connection reply message, and transmit the connection reply message onto the second network, where the connection reply message has a destination address field containing the value of the source address field of the received connection request message, a destination tunnel identifier field containing the value of the source tunnel identifier field of the received connection request message, a source address field containing the third address value, and a source tunnel identifier field containing the second tunnel identifier value;

a third network device coupled to the first and second networks, the third network device being configured to receive the connection request message having the second address value in the destination field of the connection request message and, responsive thereto, resolve the desired host name value to the third address value on the second network, create a data entry having first and second address columns and first and second tunnel identifier columns, where the third network device is further configured to store the first address value in the first address column, the first tunnel identifier value in the first tunnel identifier column, and the second address value in the second address column, insert the second address value from the second address column into the destination address field of the connection request message, insert a fourth address value into the source address field of the connection request message, where the fourth address values corresponds to the third network device on the second network, and re-transmit the connection set-up request onto the second network, the third network device being still further configured to receive the connection reply message and, responsive thereto, use the second address value from the source address field and the first tunnel identifier value from the destination tunnel identifier field of the connection reply message to find the matching data entry having the second address value in the second address column and the first tunnel identifier column, respectively, store the second tunnel identifier value in the second tunnel identifier column of the data entry, insert the first address value from the first address column into the destination field of the connection reply message, and re-transmit the connection reply message onto the first network.

15. The communication system of claim 14, where:

the first network device is further configured to transmit a data packet onto the first network, the data packet including a source address field having the first address value, a source tunnel identifier field having the first tunnel identifier value, a destination address field having the second address value, and a destination tunnel identifier field having the second tunnel identifier value; and the third network device is further configured to receive the data packet, use the first address value from the source address field and the first tunnel identifier value from the source tunnel identifier field of the data packet to find the matching data entry, where the matching data entry has the first address value in the first address column and the first tunnel identifier column, respectively, insert the third address value from the second address column of the data entry into the destination address field of the data packet, and re-transmit the data packet onto the second network.

16. The communication system of claim 14, where the third network device is pre-configured with a static data entry having a first column containing the desired host name value and a second column containing the third address value, and is further configured to resolve the desired host name value by using the desired host name value from the host name field of the connection request message to search for the matching static data entry having the desired host name value in the first column, and retrieve the third address value from the second column of the static data entry.

17. The communication system of claim 14, where the third network device is further configured to:

send a host name resolution service query having the desired host name value from the host name field of the connection request message; and receive a host name resolution service reply responsive to the host name resolution service query, the host name resolution service reply including the second address value corresponding to the desired host name value.

* * * * *